UNITED STATES PATENT OFFICE.

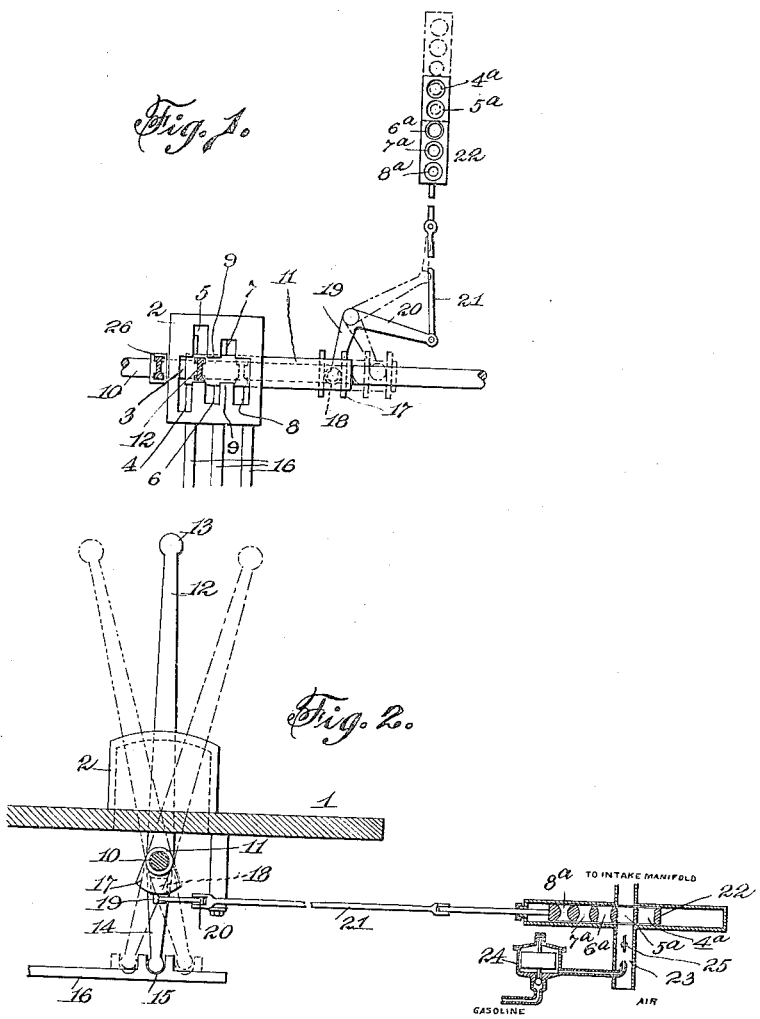

JOHN M. LANSDEN, OF NEW YORK, N. Y.

POWER CONTROL FOR MOTOR-VEHICLES.

1,397,130.

Specification of Letters Patent.   Patented Nov. 15, 1921.

Application filed December 2, 1918.   Serial No. 264,892.

*To all whom it may concern:*

Be it known that I, JOHN M. LANSDEN, a citizen of the United States, and a resident of the borough of Manhattan, city, county, and State of New York, have invented a certain new and useful Power Control for Motor-Vehicles, of which the following is a specification.

My invention relates to motor vehicles wherein the motive power is derived from an engine or motor which must run at an approximately constant speed to obtain the desired efficiency and wherein speed changes are accomplished by changing the speed ratio between the motor shaft and the driving axle or driving wheels. The changing of the speed ratio is accomplished by gearing which is capable of having relative movement to change from one speed to another and which rotate together as driver and driven elements when the proper ratio has been established.

There are various forms of speed changing mechanisms in use and I have illustrated my invention in connection with what is known as the selective system but I desire to have it understood that the invention may be carried out in connection with other forms of transmissions.

One object of the invention is to provide means whereby the power of the engine will be automatically adjusted as the speed is changed.

A further object is to provide means for preventing mistakes as to the changes in gear ratio.

A further object is to eliminate friction or spring connections for retaining the speed changing lever in neutral position, and to provide a positive lock for preventing the lever from being moved except to make the change to the speed desired.

These and further objects will more fully appear in following specification and drawings considered together or separately.

I have illustrated one embodiment of my invention in the accompanying drawings in which like parts are designated by similar characters of reference, and in which—

Figure 1 is a diagrammatic plan view, and

Fig. 2 is a diagrammatic side elevation of the same partly in section.

In the drawings 1 designates the floor of an automobile on which is mounted a quadrant 2. The quadrant, as is usual, is a metallic box-like structure having one open side which corresponds with an opening in the floor 1. That portion of the box opposite the open side is convex, as viewed from the outside, and is provided with a slot, which in the embodiment of the invention illustrated, comprises a trunk opening or slot 3 and a plurality of branches 4, 5, 6, 7 and 8 extending transversely from the trunk slot and communicating therewith. Two of the branches 5 and 7 communicate with one side of the slot 3 and three branches 4, 6 and 8 communicate with the opposite side thereof.

The branches 4, 5, 6, 7 and 8 are not oppositely disposed but are staggered relatively to each other each branch being opposite a solid portion 9 of a wall of the slot. The branches may be of different lengths if desired.

Mounted below the floor 1, and extending transversely of the body of the car is a shaft 10 in alinement with the longitudinal dimension of the trunk slot 3, and loosely carried on the shaft is a sleeve 11 to which is rigidly attached a lever 12 which extends upward through the trunk slot and is provided with a knob or handle 13. That portion of the lever which passes through the slot is so proportioned that it may be moved longitudinally of the trunk slot and may, when pivoted on the shaft 10, enter any of the branches 4, 5, 6, 7 or 8.

Carried on the sleeve 11 at the side opposite the lever 12 is an arm 14 adapted to engage a notch 15 in any one of a series of sliding bars 16, each of which coöperates with a sliding gear of a transmission gear set whereby, when one of the bars 16 is moved by means of the forward or backward movement of the lever 12, the desired gear ratio between the engine (not shown) and the driving wheels (not shown) is established.

Carried by the sleeve 11 is a pair of segmental jaws 17 between which is engaged an anti-friction roller 18 carried on one arm 19 of a bell-crank lever, the other arm 20 of which is connected by means of a link 21 with a valve member 22. The member 22 is provided with openings $4^a$, $5^a$, $6^a$, $7^a$ and $8^a$ corresponding with the branches 4, 5, 6, 7 and 8.

The member 22 is movable in relation to the mixing chamber 23 of a carbureter whereby the gasolene from the float chamber 24 is vaporized, and the explosive mixture directed to the intake manifold of an internal combustion engine.

The air chamber 23 may also be provided with the usual throttle valve 25 which is operated by a lever mounted on the steering post as is common.

The valve 22 illustrated is merely diagrammatic and applicant desires to have it understood that it is not his intention to limit himself to such construction.

The shaft 10 may carry a lever 26 and said shaft may be connected by suitable connecting rods with the brake operated in conjunction with the rear axle or wheels of the car.

The operation is as follows:

When the lever 12 is in the vertical position the transmission is at neutral and the motor may be run free. At this time the gas supply will be controlled by the throttle 25 from the steering post. If it be desired to start the car in reverse the lever 12 will be moved longitudinally of the slot 3 until it reaches the position shown in Fig. 1. The sliding movement of the lever will, through the sleeve 11, bring the arm 13 into engagement with the notch 15 in the rod 16 by means of which the proper gearing of the gear set may be moved. At the same time the bell-crank 19—20 will, by the engagement of the segmental jaws 17 with the roller 18, move the valve member 22 to bring the valve opening 5$^a$ in alinement with the mixing chamber 23.

The lever 12, because of its engagement with the wall 9 of the slot 3, can be moved in one direction only, that is into the branch 5 of the slot and the gears in the transmission box will be engaged to move the vehicle backward and, as the reverse is at the lowest speed of which the machine is capable, the passage from the mixing chamber will be wide open and the maximum amount of gas will be supplied to the engine.

Because of the loose connection between the jaws 17 and the bell-crank the valve member will not be affected by pivotal movement of the lever 12 and sleeve, and owing to the segmental shape of the jaws the control of valve member 22 by the lever 12 will be maintained, notwithstanding the position of the lever.

When it is desired to reverse and drive forward the lever is moved to the neutral position vertical in the slot and is then moved, still in its vertical position, to a position opposite the branch corresponding to the speed desired. As the lever is moved sidewise the valve member is correspondingly moved, and when the lever is thrown forward or back, as the case may be, to change the gear ratio, the valve will have been set to supply the proper amount of gas to the engine.

When the lever has been moved to select the gear ratio desired it can then be moved in one direction backward or forward. There can be no possibility of mistake. The operator cannot move the lever to drive the vehicle backward when it is his intention to drive forward, nor can he, by throwing the lever, cause the car to travel at one speed for the reason that he has moved it forward, for example, when to drive at the speed desired required a movement of the lever backward toward him.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention what I claim as new and desire to secure by Letters Patent of the United States is as follows:

A motor vehicle comprising elements adapted to change the speed ratio between the engine and driving wheels thereof, a quadrant carried by the vehicle, said quadrant comprising a plate having an elongated trunk slot therein, there being a plurality of branch slots communicating with opposite sides of said trunk slot, a wall of the trunk slot being disposed in alinement with each branch slot and opposite the entrance thereof, a shaft below the quadrant and in axial alinement with the longitudinal dimension thereof, a sleeve loosely carried on said shaft, a lever on the sleeve, said lever extending through the trunk slot, said lever being so proportioned as to be capable of movement longitudinally of said trunk when in a predetermined position, an arm on the sleeve adapted to engage an element of the speed changing mechanism, said lever and sleeve being adapted to pivot in one direction only on the shaft when the lever and a branch are in alinement to shift the selected element to change the speed ratio.

This specification signed and witnessed this 21st day of November, 1918.

JOHN M. LANSDEN.

Witnesses:
A. E. RENTON,
ABRAHAM FASTONE.